United States Patent
Christiani et al.

(10) Patent No.: US 6,745,789 B2
(45) Date of Patent: Jun. 8, 2004

(54) VALVE UNIT WITH AN OVERRIDABLE CHECK VALVE AND A FLUID POWER DRIVE FITTED THEREWITH

(75) Inventors: Peter Christiani, Neuffen (DE); Evelyn Kauer, Esslingen (DE); Rolf Maninger, Winnenden (DE)

(73) Assignee: Festo AG & Co., Esslingen (DE)

( * ) Notice: Subject to any disclaimer, the term of this patent is extended or adjusted under 35 U.S.C. 154(b) by 132 days.

(21) Appl. No.: 10/117,563

(22) Filed: Apr. 5, 2002

(65) Prior Publication Data

US 2002/0148513 A1 Oct. 17, 2002

(30) Foreign Application Priority Data

Apr. 14, 2001 (DE) .................................... 201 06 511 U

(51) Int. Cl.[7] ............................................. F15B 11/044
(52) U.S. Cl. ........................ 137/102; 91/420; 137/106
(58) Field of Search ............................ 91/420; 137/106, 137/102

(56) References Cited

U.S. PATENT DOCUMENTS

| 2,832,200 | A | * | 4/1958 | Grout et al. | ................... | 91/183 |
|---|---|---|---|---|---|---|
| 3,184,920 | A | * | 5/1965 | Lohbauer et al. | .............. | 60/546 |
| 4,147,179 | A | * | 4/1979 | Miura | .................... | 137/599.09 |
| 4,192,346 | A | | 3/1980 | Iizumi | | |
| 4,741,249 | A | | 5/1988 | Legris | | |
| 5,081,904 | A | * | 1/1992 | Horn et al. | ................... | 91/420 |
| 5,214,997 | A | * | 6/1993 | Lebret | ........................ | 91/420 |
| 6,131,610 | A | * | 10/2000 | Morisako et al. | ...... | 137/601.19 |

FOREIGN PATENT DOCUMENTS

| DE | 23 05 835 A1 | 8/1974 |
|---|---|---|
| DE | 28 01 689 C2 | 7/1979 |
| DE | 88 04 229 U1 | 6/1988 |
| DE | 44 36 548 C2 | 4/1996 |
| DE | 297 12 172 U1 | 10/1997 |
| DE | 198 37 960 A1 | 5/1999 |
| EP | 0 054 722 A1 | 6/1982 |
| EP | 0 844 401 A1 | 5/1998 |
| JP | 55-97573 A | 6/1980 |

* cited by examiner

*Primary Examiner*—Stephen M. Hepperle
(74) *Attorney, Agent, or Firm*—Hoffmann & Baron, LLP

(57) ABSTRACT

A valve unit having an overridable check valve. On a valve housing a first and a second power connection are provided, which are connected by way of a power duct, on which an overridable check valve is placed, which may be overridden by a fluid control signal, such control signal being able to be supplied to a signal input connection on the valve housing. The valve housing is additionally fitted with a signal output connection communicating with the power duct.

9 Claims, 3 Drawing Sheets

VALVE UNIT WITH AN OVERRIDABLE CHECK VALVE AND A FLUID POWER DRIVE FITTED THEREWITH

BACKGROUND OF THE INVENTION

The invention relates to a valve unit having an overridable check valve, a valve housing, on which a first and second fluid power connection are provided, which are connected by way of a power duct on which a check valve is placed, which may be overridden by a fluid control signal, said signal being able to be supplied by way of a signal input connection of the valve housing.

Furthermore, the invention relates to a fluid power drive fitted with two such valve units.

THE PRIOR ART

The German patent publication 8,804,229 U1 discloses a valve unit of this type, which is designed for connection with a fluid operated drive in the form of a fluid power cylinder. By way of the first power connection a power fluid may be supplied, which flows through the check valve in order to move same in the one direction. For the drive to operate in the opposite direction as well, the power fluid must be free to flow out through the valve unit, something which is made possible by mechanical overriding of the overridable check valve. For this purpose a fluid control signal is supplied by way of the signal input connection.

Normally a power cylinder is simultaneously fitted with two such valve units, the fluid signal to be supplied to the respectively one valve unit being tapped. In this fluid duct for this purpose it is conventional to use a T-union, which permits tapping of the fluid control signal.

SHORT SUMMARY OF THE INVENTION

One object of the invention is to reduce the degree of technical complexity involved for installation of a valve unit containing an overridable check valve.

In order to achieve these and/or other objects appearing from the present specification, claims and drawings, in the present invention in the case of a valve unit of the type initially mentioned there is a provision such that the valve housing is additionally provided with a signal output connection connected with the power duct.

A fluid operated drive is conveniently fitted with two valve units designed on these lines, the signal output connection of the respectively one valve unit being connected by way of fluid duct with the signal output connection of the respectively other valve unit.

This all means that the design complexity in connection with providing the fluid control signal and in connection with reducing the number of the components required is less. The fluid control signal required for an other valve unit may be tapped immediately at the signal output connection, which is in the form of a permanent component of the valve unit and accordingly does not have to be fitted separately. In the case of a fluid operated drive fitted with two valve units of this type there is hence a considerable reduction in the amount of assembly work and an extremely compact arrangement may be realized.

Further advantageous developments of the invention are defined in the claims.

It is convenient for the check valve to be so designed that in the absence of a control signal it permits fluid flow from the first to the second power connection and in the opposite direction turns off flow, the signal output connection being connected with the power duct's section running between the first power connection and the overridable check valve. In this design optimum response behavior is possible, since the control signal is made available even before the overridable check valve is opened by the pressure of the supplied operating fluid.

An other preferred feature of the invention is such that between the first power connection and the corresponding check valve there is in addition a choked check valve, which may be utilized in order to provide for speed control of the connected drive. If the check valve is for instance so designed that it permits fluid flow to the overridable check valve and prevents flow in the opposite direction, the valve unit may perform the task of choking the flow of spent air. In a similar manner choking of the input air flow is possible, if the turn off direction of the check valve is reversed.

If a choked check valve is present, the signal output connection is preferably connected with the power duct's section extending between the first power connection and the choked check valve.

The valve unit may in principle have an integral or one-piece valve housing. In the case of a preferred design of the invention however a multi-part structure is provided having a pivot part mounted for rotary motion on a principal body of the valve housing, preferably not only the first power connection but also the signal output connection being formed jointly on the pivot part.

The second power connection of the valve unit preferably serves for the connection to the housing of a fluid power drive, such drive being provided if desired with a screw thread which permits connection by screwing in place. The first power connection on the contrary is preferably designed for detachable connection with a fluid duct by way of which the operating fluid may be supplied and let off.

The first power connection, the signal input connection and the signal output connection may more especially be fitted respective with plug connection means, which permit releasable connection by plugging of a fluid duct.

Particularly compact dimensions and optimum access may be provided for if the first power connection and the signal output connection are aligned to be parallel and alongside one another in their arrangement.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
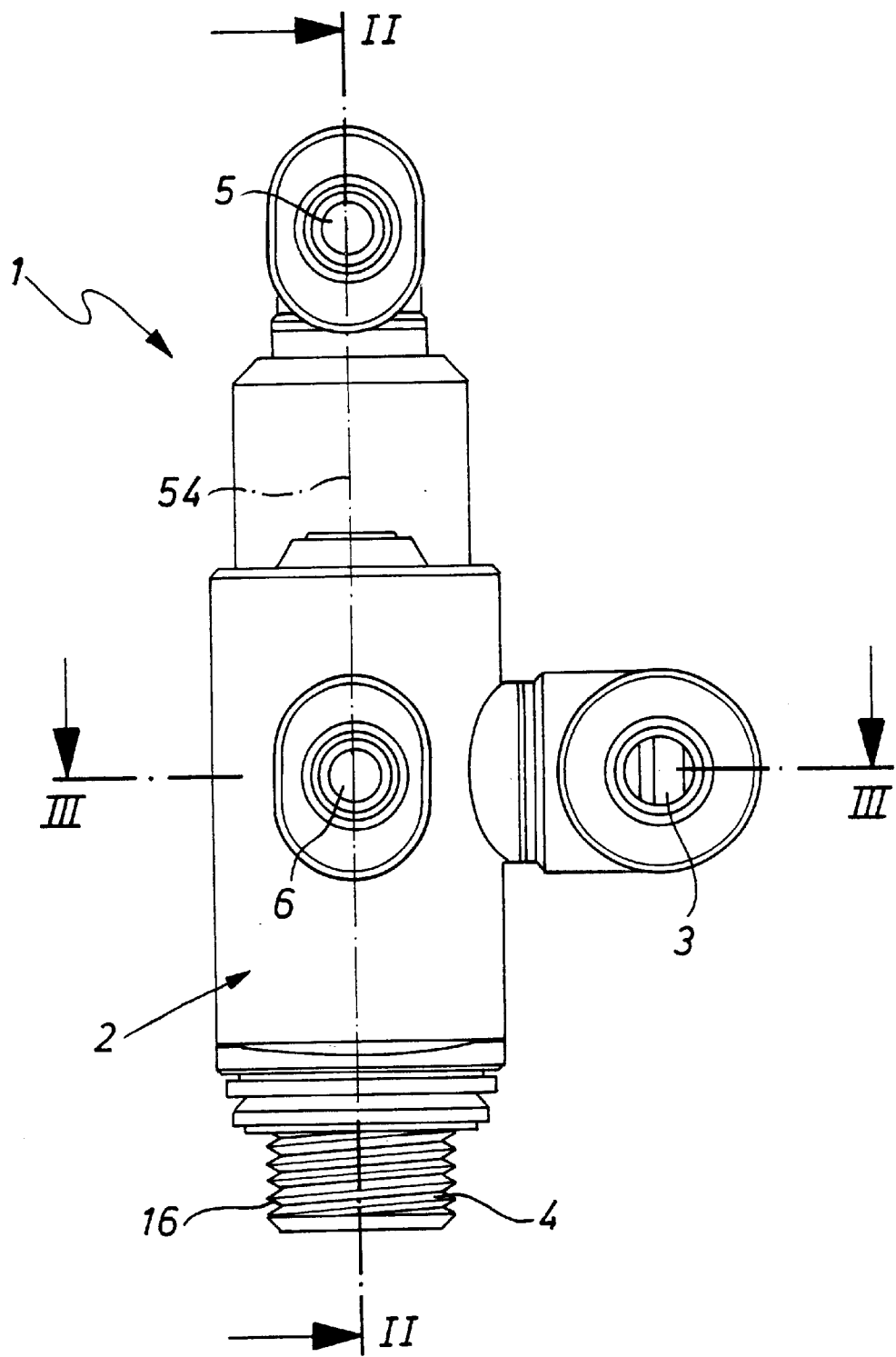
FIG. 1 shows a first form of the valve unit in accordance with the invention in a side elevation looking in the direction of the arrow I in FIGS. 2 and 3.
Figure 2:
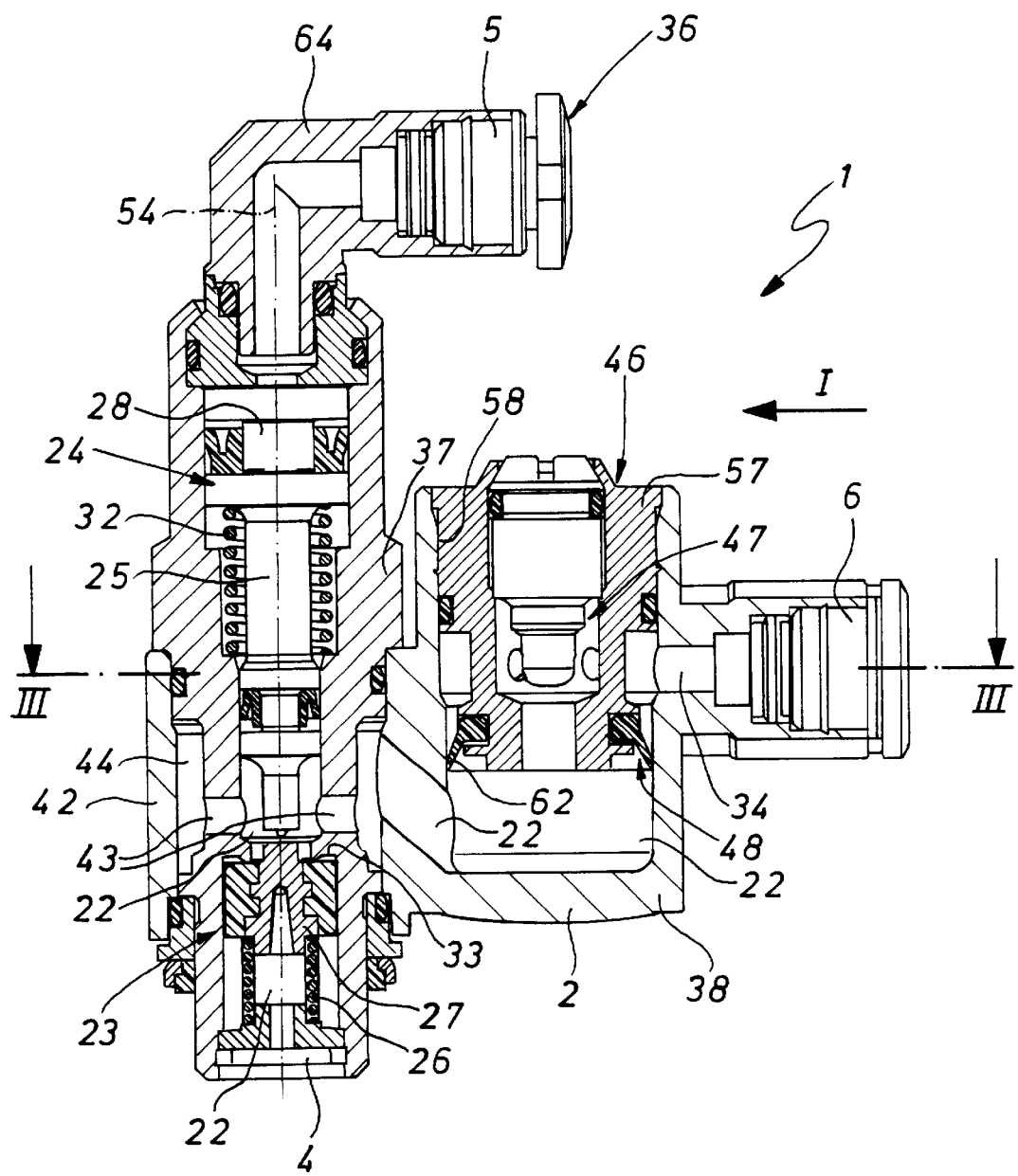
FIG. 2 is a longitudinal section through the valve unit of FIG. 1 taken on the section line II—II.
Figure 3:
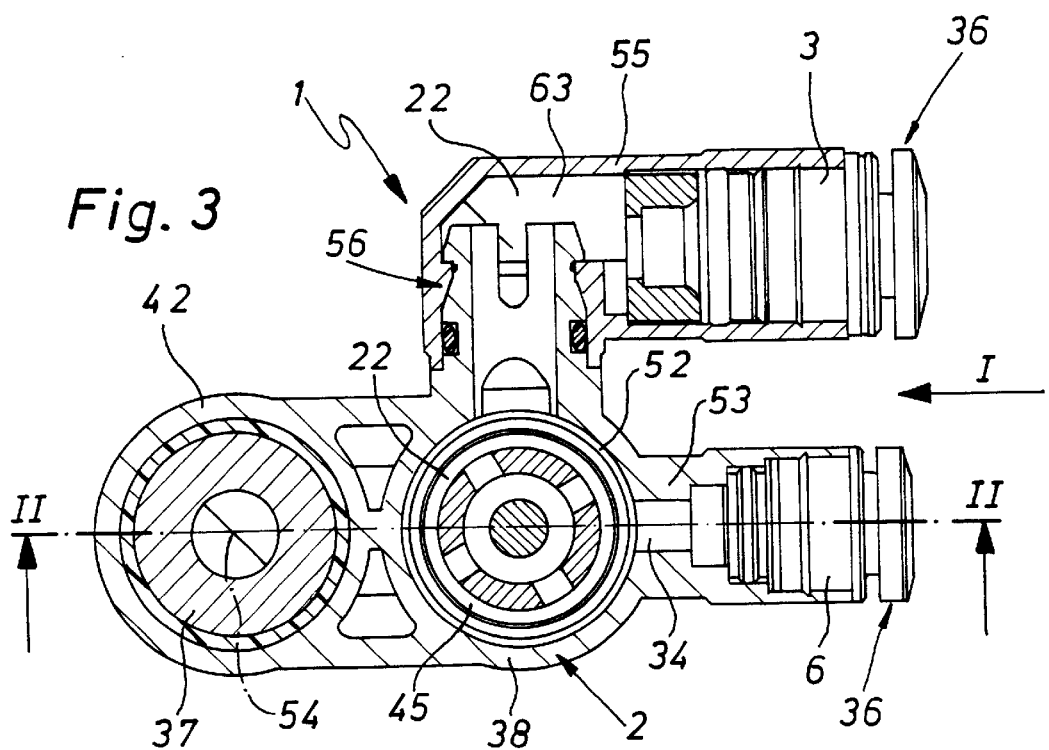
FIG. 3 is cross section taken through the valve unit of FIGS. 1 and 2 on the line III—III.

The valve unit 1 illustrated in FIGS. 1 through 3 in accordance with the invention possesses a valve housing 2 with in all four fluid connections or ports. In the case of such fluid connections it is a question of a first power connection 3, a second power connection 4, a signal input connection 5 and a signal output connection 6.

Figure 4:
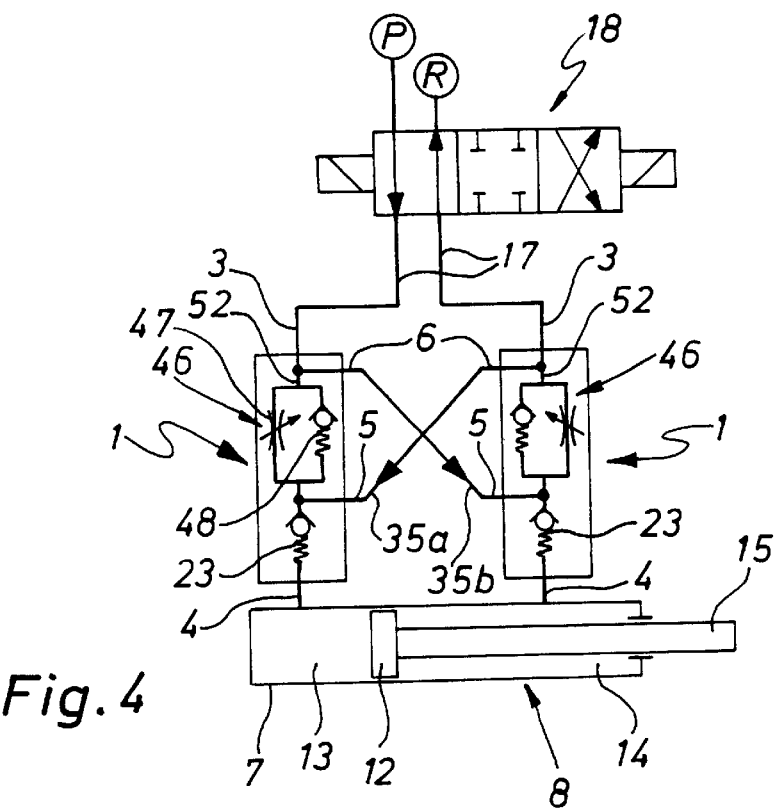
FIG. 4 is a diagrammatic view of a fluid operated drive fitted with two valve units of the type contemplated by the invention.

The second power connection 4 is designed for connection with the housing 7 of a fluid operated drive 8, as is illustrated by way of example in FIG. 4. A fluid line, more particularly in the form of pressure hose, can be connected with the three remaining connections in a detachable manner.

Reverting to FIG. 4, it will be seen that the fluid operated drive 8 depicted there comprises a piston 12 running in the housing 7 and dividing two working chambers 13 and 14 hermetically from each other. A force output member 15 kinematically coupled with the piston 12, and in the present case in the form of a piston rod, makes it possible for the piston movement to be transferred to some point outside the housing 7. The motion of the piston 12 is caused by controlled action of fluid in the two working chambers 13 and 14.

The power cylinder, which in the working example is in the form of a fluid power operated drive 8, is provided with two valve units 1 in accordance with the invention. They are only indicated symbolically in FIG. 4 and in practice are attached by way of their second power connection 4 directly to the housing 7 of the drive 8. The second power connection 4 is for this purpose more particularly provided with a screw thread 16 permitting screwing into a complementary connection hole in the housing 7.

The first power connection 3 renders possible the connection of a fluid duct 17, which in accordance with FIG. 4 will be seen to lead to a control valve 18, by which selectively the supply or removal of an actuating fluid may be caused into the and, respectively, from the first power connection 3. The actuating fluid will be more particularly compressed air.

In the case of a fluid operated drive 8 having two valve units 1 the first power connection 3 may be so coupled with the control valve 18 that fluid supply may be caused to the one first power connection 3 and simultaneously the removal of fluid from the other first power connection 3. The control valve 18 may be a three position valve in order to able to set a neutral position as well, in which the first power connections 3 are completely shut off.

The first and the second power connections 3 and 4 are connected with each other by way of a power duct 22 extending in the interior of the valve housing 2. This power duct 22 is bent several times and causes a multiple redirection of the actuating fluid conducted by it.

On the power duct 22 a mechanically overridable check valve 23 is placed. Such check valve is so designed and arranged that it opens under pressure of the operating fluid flowing by way of first power connection 3 and hence renders possible flow of the operating fluid to the second power connection 4. Operating fluid supplied owing to the action of the control valve 18 may in this manner flow through the valve unit 1 into the connected power chambers 13 and 14.

In the opposite direction the overridable check valve 22 closes. The fluid pressure obtaining at the second power connection is consequently independently of its level not able to close the overridable check valve 23.

In order for the piston 12 in the housing 7 of the drive 8 to be able to move in the housing 7 of the drive 8, it is necessary to have simultaneously a pressurization of the respective one power chamber 13 and, respectively, 14, accompanying removal of fluid from the respectively other power chamber 13 or 14. Since this is not readily possible owing to the obstructing action of the overridable check valve 22, the check valve 23 is overrridden by external action, that is to say switched over into the open position. This is performed by the action of a fluid, which is supplied to the valve unit 1 by way of the signal input connection 5 every time overriding of the check valve 23 is to be overridden.

In the interior of the valve housing 2 an override means 24 is provided having a valve member 25 like a plunger for example, which arranged as an extension of the valve member 27 which is biased into the closed position, of the overridable check valve 23. The fluid entering by way of signal input connection 5 acts on a piston-like terminal section 28 of the overriding member 25, which accordingly is shifted against the force of a return spring 32 toward the valve member 27 and finally moves the latter clear of the valve seat 33 of the check valve 23. Accordingly the path is free for the operating fluid trapped in a power chamber 13 to flow through the overridden check valve 23 to the first power connection 3.

The check valve 33 is thus overrridden by a fluid control signal, which is supplied by way of the signal input connection. If this control signal is interrupted, the overriding member 25 will return in the initial position so that furthermore the overridable check valve 23 will return backinto the closed position.

A particular advantage of the valve unit 1 of the invention is that it already has the above mentioned signal output connection 6. The latter is connected by way of a tapping or branch duct 34 continuously with the power duct 22. The pressure obtaining in the power duct 22 is accordingly also present at the signal output connection 6.

If in accordance with the fluid circuit scheme of figure for fluid connections two valve units 1 are used with a fluid operated drive 8, by means of a fluid duct 35a and 35b of the signal output connection 6 of a valve unit may be connected with the signal input connection 5 of the respectively other valve unit for fluid flow.

If now operating fluid is supplied at the first power connection 3 of a valve unit 1 which may flow through the respective valve unit 1 into the connected power chamber of the drive 8, a fluid control signal, which is tapped by way of signal output connection 6 of the valve unit 1 from the associated power duct 22, will at the same time pass to the signal input connection 5 of the other valve unit with the result that the overridable check valve 23 is overrridden and pressure medium may flow from the associated power chamber.

Since the signal output connection 6 is a direct component of the valve unit 1, the amount of work required for installation of the fluid means is extremely small. It is more particularly possible to dispense with fitting a T-union on the fluid duct 17 running to the first power connection 3 in each case in order to tap the fluid control signal at this point.

It is convenient for both the first power connection 3 and also the signal input connection 5 and the signal output connection 6 to be fitted with a plug connection means 36, which renders possible a releasable plugged assembly of the fluid duct, which is to be connected.

The valve housing 2 of the valve unit 1 in this example of the invention is of multi-part design. It comprises an elongated principal body 37 which at one end is provided with the second power connection 4 and at the other end, which faces upward in FIGS. 1 and 2, is provided with a signal input connection 5. A pivot part 38 of the valve housing 2 is rotatably mounted on this principal body 37, said housing 2 having an annular bearing region 42, which is mounted for turning on the principal body 37. The first power connection 3 and the signal output connection 6 are arranged jointly on the pivot part 38 and therefore may be jointly positioned in any desired angular setting in relation to the principal body by pivoting the pivot part 38.

The arrangement clearly illustrated in FIG. 3 is particularly advantageous in which the first power connection 3 and the signal output connection 6 are aligned so as to be parallel to one another and are preferably also arranged alongside each other. Irrespectively of the instantaneous position of pivoting such two fluid connections are always aligned with each other and render possible simple connection of a fluid line leading to other equipment.

Together with the overriding means 24 the overridable check valve 23 is located in the interior of the principal body 37. The power duct 22 extends somewhat from the second power connection 4 initially coaxially in the interior of the principal body 37 and following the overridable 23 it merges by way of radially extending branch ducts 43 with an annular space 44 arranged concentrically between the principal body 37 and the bearing section 42, whence it runs on farther in the interior of the pivot part 38 to the first power connection 3.

The signal output connection 6 is connected by way of the above mentioned branch duct 34 preferably with the duct section 45, extending between the first power connection 3 and the overridable check valve 23, of the power duct 22. The fluid pressure supplied by way of first power connection 3 is therefore practically available directly at the signal output connection 6 and is available without delay as fluid control signal.

As a further feature the valve unit 1 in the working embodiment has additionally a choked check valve 46. Same comprises, in a parallel circuit, a choke means 47 which is preferably adjustable as regards the choking effect thereof, and a check valve 48.

The choked check valve 46 is placed on the previously mentioned duct section 45 and is preferably seated in the pivot part 38 at a radial distance from the principal body 37.

In the working embodiment the check valve 48 is so designed that it permits a flow of fluid from the one power connection 3 to the overridable check valve 23 and prevents such flow in the opposite direction. The operating fluid supplied by way of first power connection 3 can consequently flow through the valve unit 1 unhindered, whereas in the other direction of flow only a choked exit flow is possible so that in this fashion it is possible to influence the speed of displacement of the piston 12 of the drive 8.

In principle the check valve 48 could be designed to have the opposite direction of closing in order to render possible a choking effect on the output air flow instead of on the supplied air flow.

The fluid connection between the signal output connection 6 and the duct's section 45 is preferably in that section 52 of the power duct 22 which extends between the choked check valve 46 and the first power connection 3. This in turn means that there is a connection between the first power connection 3 and the signal output connection 6.

As shown in FIG. 3 the pivot part 38 may be of multi-part design. It possesses here a principal part 53 having the bearing section 42 and which extends away from the longitudinal axis 54, defining the axis of rotation of the pivot part 38, of the principal body 37. The signal output connection 6 is a direct component of the principal part 53. The first power connection 3 on the contrary is provided on its own connection part 55, using a plug connection 56 with a sealing effect on the principal part 53. The plug connection 56 may be so designed that the connection part 55 may be pivoted in relation to the principal part 53.

In the working embodiment the connection part 55 is plugged on laterally to the principal part 53, the latter possessing a suitable plug-on nipple. Since the plug connection 56 is laterally placed on the connection part 55, there is all in all an angled arrangement so that the parallel alignment of the two power connections 3 and 4 is ensured.

The choked check valve 45 is preferably seated in the principal part 53 of the pivot part 57. The chock check valve 46 contains a cartridge 57, which is plugged into a socket 58 in the pivot part 38 and which on the one hand comprises the choke means 47 and on the other hand is fitted with the valve member 62 of the check valve 48. In the case of the valve member 62 it is a question of a flexible sealing lip, which is with the a valve seat constituted by the peripheral face of the socket 58.

The input section 63, extending from the first power connection 3, of the power duct 22 opens, like the branch duct 34 running to the signal output connection 6, laterally into the socket 58.

In connection with the signal input connection 5 it is also to be noted that in accordance with FIG. 2 it may be provided on an angle piece 64 which is mounted in bearing means on the principal body 37, for instance in a pivoting manner. The arrangement may furthermore be such that the signal input connection 5, like the first power connection 3 and the signal output connection 6, are aligned to be at a right angle to the longitudinal axis 54 of the principal body 37 of the valve housing 2.

What is claimed is:

1. A valve unit comprising an overridable check valve and a valve housing, on which a first and second fluid power connection are provided, which are connected by way of a power duct on which a check valve is placed, which may be overridden by a fluid control signal, said signal being able to be supplied by way of a signal input connection of the valve housing, wherein the valve housing further includes a branch duct formed therein, said branch duct communicating with said power duct and forming a signal output connection integral with said valve housing for permitting fluid control signal tapping directly from the valve housing.

2. The valve unit as set forth in claim 1, wherein the check valve is so designed that in the absence of a fluid control signal it permits fluid flow from the first to the second power connection and in the opposite direction turns off flow, the signal output connection being connected with the power duct's section running between the first power connection and the overridable check valve.

3. The valve unit as set forth in claim 1, wherein between the first power connection and the overridable check valve a choked check valve is arranged either permitting a fluid flow to the overridable check valve and preventing such flow in the opposite direction or vise versa.

4. The valve unit as set forth in claim 3, wherein the signal output connection is connected with the power duct's section running between the first power connection and the choked check valve.

5. A valve unit comprising an overridable check valve and a valve housing, on which a first and second fluid power connection are provided, which are connected by way of a power duct on which a check valve is placed, which may be overridden by a fluid control signal, said signal being able to be supplied by way of a signal input connection of the valve housing, wherein the valve housing is additionally provided with a signal output connection connected with the power duct and, wherein the first power connection and the signal output connection are arranged jointly on a pivot part, which is rotatably mounted on a principal body of the valve unit, said principal body having the second power connection and the signal input connection.

6. The valve unit as set forth in claim 1, wherein the first power connection is designed for the detachable connection of a fluid duct and the second power connection is designed for the connection of a fluid operated drive on the housing, the second power connection preferably being provided with a screw thread.

7. The valve unit as set forth in claim 1, wherein the first power connection, the signal input connection and the signal output connection are respectively provided with a plug connection means permitting fitting by plugging of the a fluid duet.

8. A valve unit comprising an overridable check valve and a valve housing, on which a first and second fluid power connection are provided, which are connected by way of a power duct on which a check valve is placed, which may be overridden by a fluid control signal, said signal being able to be supplied by way of a signal input connection of the valve housing, wherein the valve housing is additionally provided with a signal output connection connected with the power duct and wherein the first power connection and the signal output connection are aligned to be parallel to one another and are placed side by side.

9. A fluid power drive comprising two valve units as set forth in claim 1, wherein the signal output connection of the respectively one valve unit communicates by way of a fluid duct with the signal input connection of the respectively other valve unit.

* * * * *